Patented Jan. 12, 1932

1,840,909

UNITED STATES PATENT OFFICE

GEORGE F. MEEHAN, OF FAR ROCKAWAY, AND ARTHUR L. KENNEDY, OF NEW YORK, N. Y., ASSIGNORS, BY MESNE ASSIGNMENTS, TO WAKEFIELD DORT, OF KEENE, NEW HAMPSHIRE

FRICTION MATERIAL

No Drawing. Application filed July 30, 1924, Serial No. 729,062. Renewed May 27, 1931.

The invention relates to the manufacture of friction material and includes correlated improvements and discoveries whereby and wherewith the useful properties of such material are enhanced.

An object of the invention is to provide a friction disk for use in power transmission clutches.

Another object of the invention is to provide a friction lining or facing which may be employed as a clutch facing, a band lining and a brake shoe facing.

Other objects of the invention are to provide a friction material which does not soften under heat, wears smoothly and evenly, grips the opposing surface readily and without shock, releases without sticking and is unaffected by oil.

Other objects of the invention will in part be obvious and will in part appear hereinafter.

The invention accordingly comprises the several steps and the relation and order of one or more of such steps with respect to each of the others, and the article possessing the features and properties which are exemplified in the following detailed disclosure, and the scope of the application of which will be indicated in the claims.

In the practice of the invention there may be used as the base for the manufacture of friction material a porous substance such as wood, cork, leather, cotton and asbestos, which may be treated or impregnated and admixed with a binding agent, as an extractive from sea growth, for example kelp, as the laminaria, in the form of a metallic salt derivative.

The metallic salt derivative may be prepared by extracting sea growth with a suitable medium and precipitating with a solution of a metallic salt, such as salts of copper, iron, zinc and aluminum. It may also be prepared by utilizing the whole leaf of the sea growth. The whole leaf, freed from adhering matters, may be dried, ground, treated with a solution of a metallic salt, and the mass so obtained employed as such in conjunction with a plasticizing agent, for example ammonium hydroxide, and amino derivatives of the pyridine bases, or in admixture with a porous substance, as asbestos fiber, which admixture prior to use may be plasticized.

Further the binding agent may contain, in addition to the metallic salt derivative of sea growth, an extract having adhesive properties preferably obtained by means of an alkaline solution, of other vegetable growth, more particularly tropical and sub-tropical swamp growths, as the roots of the scrub palmetto and mangrove. When using a vegetable swamp growth extract, the preferred proportion is between 25% and 35% based on the solid content of the extract.

The base material, may be impregnated with the binding agent in the desired condition of plasticity by admixture therewith or by spreading on or rolling in, when fabric is utilized. The impregnated material is then formed into the proper shape under pressure, and the finished formed material dried at a low temperature. The drying may be accelerated by conducting the drying operation with a free circulation of air.

The friction material, when manufactured from a fabric, may be of a laminated or built up structure and when laminated it may be manufactured by impregnating or spreading the binding agent upon the fabric, superposing several pieces of the so prepared fabric—cut to form, if so desired, for example ring-shaped—in a form or die, subjecting to pressure and drying.

As illustrative embodiments of a manner in which the invention may be carried into practice, the following examples are presented:

*Example I.*—For the manufacture of a friction disk or ring adapted for use in power transmission clutches, woven asbestos fabric, which may be reinforced with wire, is suitably cut on the bias. The binding agent may be composed of a metallic salt derivative of the whole leaf of kelp, admixed with fine or waste abestos fibers, the percentage of which fiber may vary from 30% to 80%, depending upon the type of disk desired and the character of the work it will be called upon to perform. The whole leaf-asbestos binding agent is brought to the proper degree of plasticity by means of ammonium hydroxide, 26% diluted with an equal volume of water, and is then spread on or rolled into the asbestos fabric. The fabric is superposed into three or more layers or laminations, placed into a die of proper dimensions, and subjected to pressure, which may range up to 100 pounds per square inch. The formed material is finally dried at a temperature of from about 130° to 140° F. with free circulation of air.

A friction disk or ring may likewise be prepared from an asbestos fabric by preparing a readily flowable liquor from the whole leaf-asbestos binding agent by means of dilute ammonium hydroxide and spreading or impregnating the fabric with this liquor. Upon the surfaces of the fabric is then spread a heavier plastic mass of the same binding agent. The fabric is folded as above outlined and subjected to pressure. The heavier plastic mass is forced into the meshes of the fabric and gives thereby a more closely bound and firmer structure.

*Example II.*—For the production of a friction material which may be a ring, disk, facing or lining, the metallic salt derivative of the whole leaf of kelp, together with fine asbestos fiber as set forth in Example I, is dried and finely ground. The dried and ground binding agent is admixed with asbestos fiber and the admixture plasticized to a readily workable mass by means of dilute ammonium hydroxide or an amino derivative of a pyridine base. The plastic mass is then placed into a form or die and subjected to pressure, which may range up to 120 pounds per square inch. The finished friction material is finally dried, as previously set forth.

*Example III.*—The whole leaf of kelp is dried and ground, and treated with an alkaline solution for example, sodium carbonate or other mild alkali, until a readily flowable liquor is obtained. To this liquor there is added asbestos fiber in an amount of from 85% to 95%. The asbestos and liquor are thoroughly mixed, whereupon there is added to the mixture a solution of a metallic salt, such as a salt of copper, zinc, iron and aluminum, which forms an insoluble metallic salt derivative of constituents of the whole leaf. In order to obtain complete precipitation, there should be added an excess of the metallic salt. The product is washed in order to remove by-products, dried, and ground. The ground product is then treated with dilute ammonium hydroxide until the mass may be readily worked, when it is placed in a die or mould of desired shape and dimensions, subjected to pressure, and finally dried.

In each of the foregoing examples, if it is so desired, there may be added to the binding agent an alkaline extract, for which sodium carbonate may be used, from scrub palmetto root in an amount up to 35%, based upon the solid content of the extract. Addition of scrub palmetto root extract augments the adhesive properties of the binder within the proportions mentioned. However, in larger proportions the product does not dry well and has a tendency to remain in a gelatinous form.

Furthermore, sheets of impregnated asbestos may be produced by thoroughly admixing asbestos fiber with an extract or with the whole leaf of a sea growth, precipitating a metallic salt derivative by adding a solution of a metallic salt, forming the fluid mass into a thin sheet, and drying. From the sheets, which are thus obtained, disks, linings, facings, etc., may be manufactured by cutting to form, moistening with a plasticizing agent, folding to give a laminated structure, pressing and drying.

The friction materials produced in accordance with the invention possess the properties, qualities and characteristics desired with respect to clutch disks and linings and facings for brake shoes. The material is water-proof, is not affected by oils, and possesses the other properties which have been referred to hereinbefore.

Since certain changes in carrying out the above process, and certain modifications in the article which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A friction material which comprises laminations of asbestos fabric impregnated with and bound together by a heavy metal salt derivative of the whole leaf of a laminaria.

2. A friction material which comprises laminations of asbestos fabric impregnated with a heavy metal salt derivative of the whole leaf of kelp and an extract of scrub palmetto root.

3. A binding agent containing asbestos fiber and a heavy metal salt derivative of the whole leaf of kelp.

4. A binding agent containing a heavy metal salt derivative of the whole leaf of kelp.

5. A binding agent containing a heavy metal salt derivative of the whole leaf of a laminaria.

6. A binding agent containing a heavy metal salt derivative of the whole leaf of kelp and an extract of scrub palmetto root.

7. A binding agent containing from 30% to 80% of asbestos and 20% to 70% of a heavy metal salt derivative of a sea growth.

8. A process for the manufacture of friction material which comprises treating a porous substance with a heavy metal salt derivative of a sea growth, plasticizing forming under pressure, and drying.

9. A process for the manufacture of friction material which comprises treating a porous substance with a heavy metal salt derivative of a sea growth, plasticizing, forming under a pressure of about 100 pounds per square inch, and drying at a temperature less than 140° F.

10. A process for the manufacture of friction material which comprises drying and grinding the whole leaf of a sea growth, preparing a readily flowable liquor therefrom with an alkaline solution, admixing asbestos fiber with said liquor, adding a solution of a heavy metal salt thereto, drying, plasticizing, forming under pressure, and again drying.

11. A process for the manufacture of friction material which comprises admixing a heavy metal salt derivative of a sea growth with a porous substance, adding dilute ammonium hydroxide thereto until a plastic mass is obtained, placing the plastic mass in a form, then pressing and drying.

12. An article of manufacture comprising a porous substance and a heavy metal salt derivative of a sea growth.

13. A friction material comprising asbestos and a heavy metal salt derivative of a laminaria.

14. A friction material comprising a porous substance and a heavy metal salt derivative of the whole leaf of kelp.

15. A friction material comprising asbestos fabric impregnated with a heavy metal salt derivative of kelp.

16. A friction material comprising a porous substance, a heavy metal salt derivative of a sea growth and an extract of scrub palmetto root.

In testimony whereof we affix our signatures.

GEORGE F. MEEHAN.
ARTHUR L. KENNEDY.